(12) United States Patent
Cleary

(10) Patent No.: US 9,081,454 B2
(45) Date of Patent: Jul. 14, 2015

(54) TOUCH SENSOR WITH CAPACITIVE VOLTAGE DIVIDER

(71) Applicant: Feargal Cleary, Trim (IE)

(72) Inventor: Feargal Cleary, Trim (IE)

(73) Assignee: Atmel Corporation, San Jose, CA (US)

( * ) Notice: Subject to any disclaimer, the term of this patent is extended or adjusted under 35 U.S.C. 154(b) by 189 days.

(21) Appl. No.: 13/852,816

(22) Filed: Mar. 28, 2013

(65) Prior Publication Data

US 2014/0292704 A1 Oct. 2, 2014

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)

(58) Field of Classification Search
CPC ..... G06F 3/044; G06F 3/0421; G06F 3/0448; G06F 3/016; G06F 3/041; G06F 3/0412; G06F 3/0416; G06F 3/045
USPC ........................................ 345/156, 173–175
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,743,060 | B2 * | 6/2014 | Hotelling ...................... 345/173 |
| 2009/0315854 | A1 | 12/2009 | Matsuo |
| 2011/0109585 | A1 * | 5/2011 | Kwon et al. .................. 345/174 |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2012/0268416 | A1 * | 10/2012 | Pirogov et al. ................ 345/174 |
| 2013/0162586 | A1 * | 6/2013 | Erdogan et al. ............... 345/174 |

FOREIGN PATENT DOCUMENTS

WO WO 2012/129247 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Duc Dinh
(74) *Attorney, Agent, or Firm* — Baker Botts LLP

(57) ABSTRACT

In certain embodiments, a touch-sensor controller is operable to apply a first voltage to a first drive line. The first drive line comprises a first one or more drive electrodes. The touch-sensor controller is further operable to measure a second voltage across a capacitor. The capacitor is coupled to a first sense line. The first sense line comprises a first one or more sense electrodes. The touch-sensor controller is further operable to determine, based on the second voltage across the capacitor, a touch at a first capacitive node formed by an overlapping of a first region of the first drive line and a first region of the first sense line.

17 Claims, 4 Drawing Sheets

TOUCH SENSOR WITH CAPACITIVE VOLTAGE DIVIDER

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor, which in many cases includes a screen.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch sensor, a change in capacitance may occur within the touch screen at the location of the touch or proximity. A touch-sensor controller may process the change in capacitance to detect the event of a touch being applied to the touch sensor and in certain applications, may determine the position of the touch on the touch sensor.

DESCRIPTION OF EXAMPLE EMBODIMENTS

Figure 1:
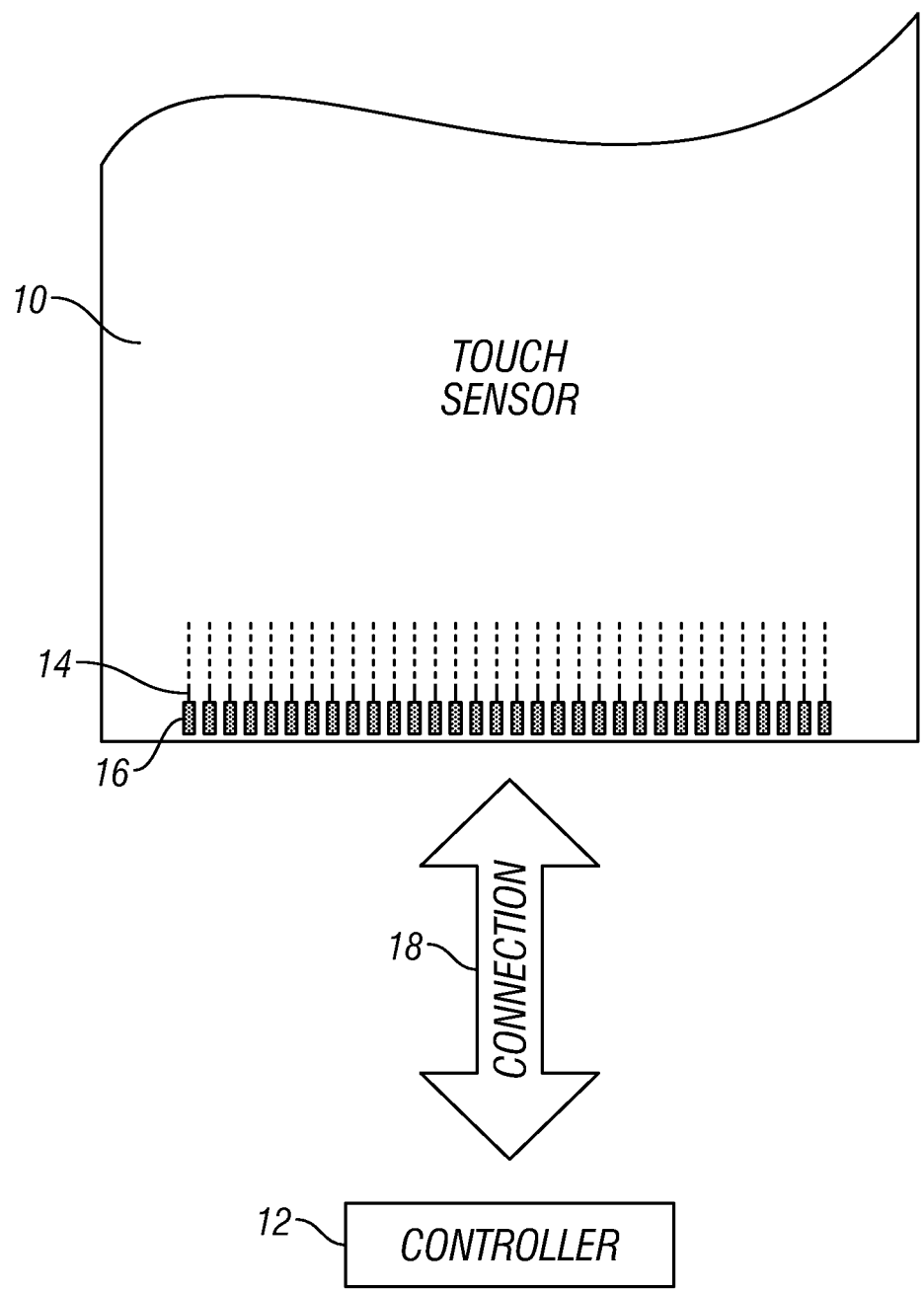
FIG. 1 illustrates an example touch sensor with an example touch-sensor controller, according to certain embodiments of the present disclosure.

FIG. 1 illustrates an example touch sensor 10 with an example touch-sensor controller 12, according to certain embodiments of the present disclosure. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the occurrence of the touch and/or its position or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 includes analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
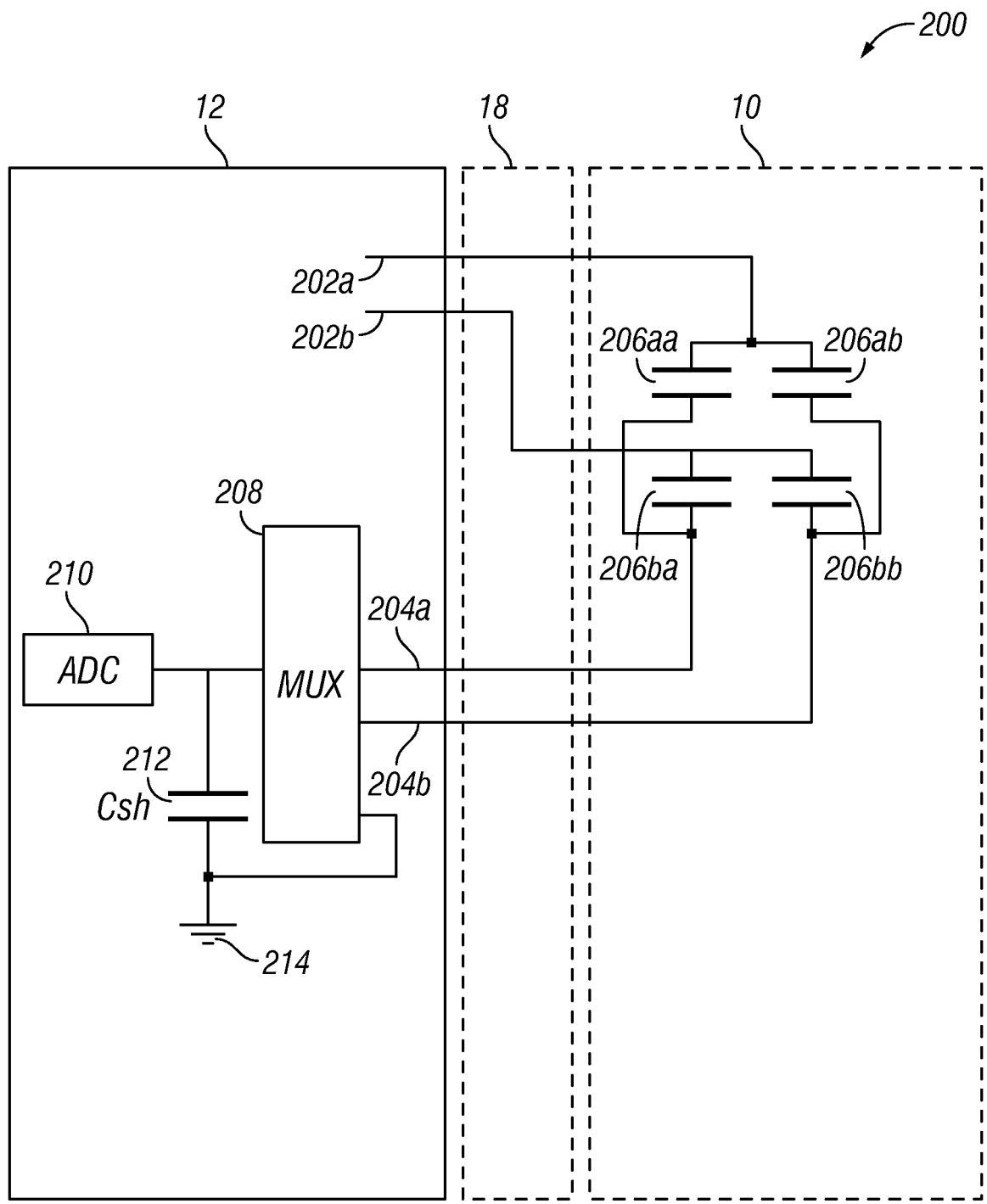
FIG. 2A illustrates a system comprising the example touch sensor of FIG. 1, the example touch-sensor controller of FIG. 1 with an example voltage divider, and the example connection of FIG. 1, according to certain embodiments of the present disclosure.

FIG. 2A illustrates system 200 comprising the example touch sensor 10 of FIG. 1, the example touch-sensor controller 12 of FIG. 1 with an example voltage divider, and the example connection 18 of FIG. 1, according to certain embodiments of the present disclosure. System 200 may reduce or eliminate one or more problems with previous systems for sensing touch. In certain embodiments, system 200 may require fewer microcontroller-unit (MCU) pins than previous systems for sensing touch and may require only one pin for each drive line and each sense line. In certain embodiments, system 200 may not require input of a reference voltage to a comparator. In certain embodiments, system 200 may not require a Switch-Mode-Pump (SMP) pin, which may be required for discharging the external sense capacitors used in previous systems. System 200 may also require fewer external components than previous systems, including fewer or no external capacitors and/or resistors. System 200 may also exhibit lower frequency noise than previous systems for sensing touch. Unlike previous systems for sensing touch, system 200 may not be dependent on oscillator stability and may allow for improved software configurability. Also unlike previous systems, tuning of system 200 may be done entirely through software settings, with no hardware tuning (component selection) required.

Touch sensor 10 may include drive lines 202, sense lines 204, and capacitive nodes 206. Connection 18 also may include portions of drive lines 202 and sense lines 204 or any other suitable components for connecting drive lines 202 and sense lines 204 of touch-sensor 10 to touch-sensor controller 12. Touch-sensor controller 12 may include multiplexer 208, analog-to-digital converter 210, capacitor 212, and ground 214.

Drive lines 202 of touch sensor 10 may include one or more drive electrodes. Sense lines 204 of touch sensor 10 may include one or more sense electrodes. In particular embodiments, drive lines 202 may run substantially perpendicular to sense lines 204. In particular embodiments, drive lines 202 and sense lines 204 may be connected to touch-sensor controller 12 by connection 18. Portions of drive lines 202 and/or sense lines 204 may be included in touch-sensor controller 12, connection 18, and/or touch sensor 10. Alternatively or in addition, drives lines 202 and/or sense lines 204 may be included exclusively in touch sensor 10 and distinct connection components, such as tracks 14 and connection pads 16 described with reference to FIG. 1, or any other suitable components, may connect drive lines 202 and/or sense lines 204 to touch-sensor controller 12.

Capacitive nodes 206 may form by the overlapping of regions of drive lines 202 and regions of sense lines 204. For example, capacitive node 206*aa* may form by on overlapping of a region of drive line 202*a* and a region of sense line 204*a*. As additional examples, capacitive node 206*ab* may form by an overlapping of a region of drive line 202*a* and a region of sense line 204*b*, capacitive node 206*ba* may form by an overlapping of a region of drive line 202*b* and a region of sense line 204*a*, and capacitive node 206*bb* may form by an overlapping of a region of drive line 202*b* and a region of sense line 204*b*. In particular embodiments, each capacitive node 206, or overlapping of a region of one drive line 202 and a region of one sense line 204, may correspond to an intersection of one drive electrode and one sense electrode, respectively.

Multiplexer 208 may be a component that selects one of several analog or digital input signals and forwards the selected signal into a single line. Multiplexer 208 may be considered a multiple-input, single-output switch. For example, multiplexer 208 may be a 3-to-1 multiplexer that selects between inputs from sense line 204*a*, sense line 204*b*, and the line connecting ground 214 and multiplexer 208 and outputs to the line connecting analog-to-digital converter 210 and multiplexer 208. In other words, multiplexer 208 may be used to couple analog-to-digital converter 210 to one of sense line 204*a*, sense line 204*b*, and ground 214 and may be considered a switch to alternate between these three coupling options. Multiplexer 208 may be required for switching between multiple sense lines 204. In certain embodiments, multiplexer 208 may not, itself, form a part of the sensing mechanism.

Analog-to-digital converter 210 may be a component operable to convert a continuous physical quantity, such as voltage, to a digital number that represents the quantity's amplitude. Instead of performing a single conversion, analog-to-digital converter 210 may perform the conversions by sampling the input periodically. Analog-to-digital converter 210 may include a capacitor, such as capacitor 212. In certain embodiments, analog-to-digital converter 210 may not include a capacitor.

Capacitor 212 may be a passive two-terminal component that may store energy in an electric field. Capacitor 212 may include two electrical conductors separated by an insulator. For example, in certain embodiments, capacitor 212 may include metal foils separated by a thin layer of insulating film. Capacitor 212 may be coupled to one or more other components in system 200, which may result in a voltage across capacitor 212 and a static field developing across the insulator, causing positive charge to collect on one of the electrical conductors and causing a negative charge to collect on the other. Energy may be stored in the electrostatic field. Capacitor 212 may have a capacitance, measured in farads, that is the ratio of the electric charge on each electrostatic conductor to the voltage between them. Touch-sensor controller 12 may be operable to measure the voltage across capacitor 212. Although depicted, in FIG. 2, as being external to analog-to-digital converter 210, capacitor 212 may be included in analog-to-digital converter 210.

Ground 214 may be a component for driving one or more components to a ground voltage. For example, ground 214 may be a component at a reference voltage, or ground voltage, from which other voltages in system 200 are measured. Although depicted in FIG. 2 as being a single component, ground 214 may represent any suitable number of components, each at a similar voltage that is approximate a ground voltage. The ground voltage may be any suitable voltage from which a difference in voltage at another component can be relatively measured. Ground 214 may be at a voltage equal to or approximate to ground voltage and may be used to drive one or more components to a voltage that is approximate the ground voltage, according to particular needs.

Modifications, additions, or omissions may be made to system 200 without departing from the scope of the disclosure. The components of the systems and apparatuses may be integrated or separated. For example, capacitor 212 may be integrated into analog-to-digital converter 210. As another example, while FIG. 2A shows two drive lines 202*a*-*b*, two sense lines 204*a*-*b*, four capacitive nodes 206, and multiplexer 208 for switching between the two sense lines 204 and/or for discharging capacitor 212, system 200 may include more or fewer drive lines 202, sense lines 204, capacitive nodes 206, and/or may exclude multiplexer 208. For example, system 200 may include only one drive line 202, only one sense line 204, and only one capacitive node 206; may exclude multiplexer 208; and may include a single pole switch or other component for switching capacitor 212 to ground 214 in order to discharge capacitor 212.

Example operations of system 200 are described below with reference to FIG. 2B.

Figure 2B:
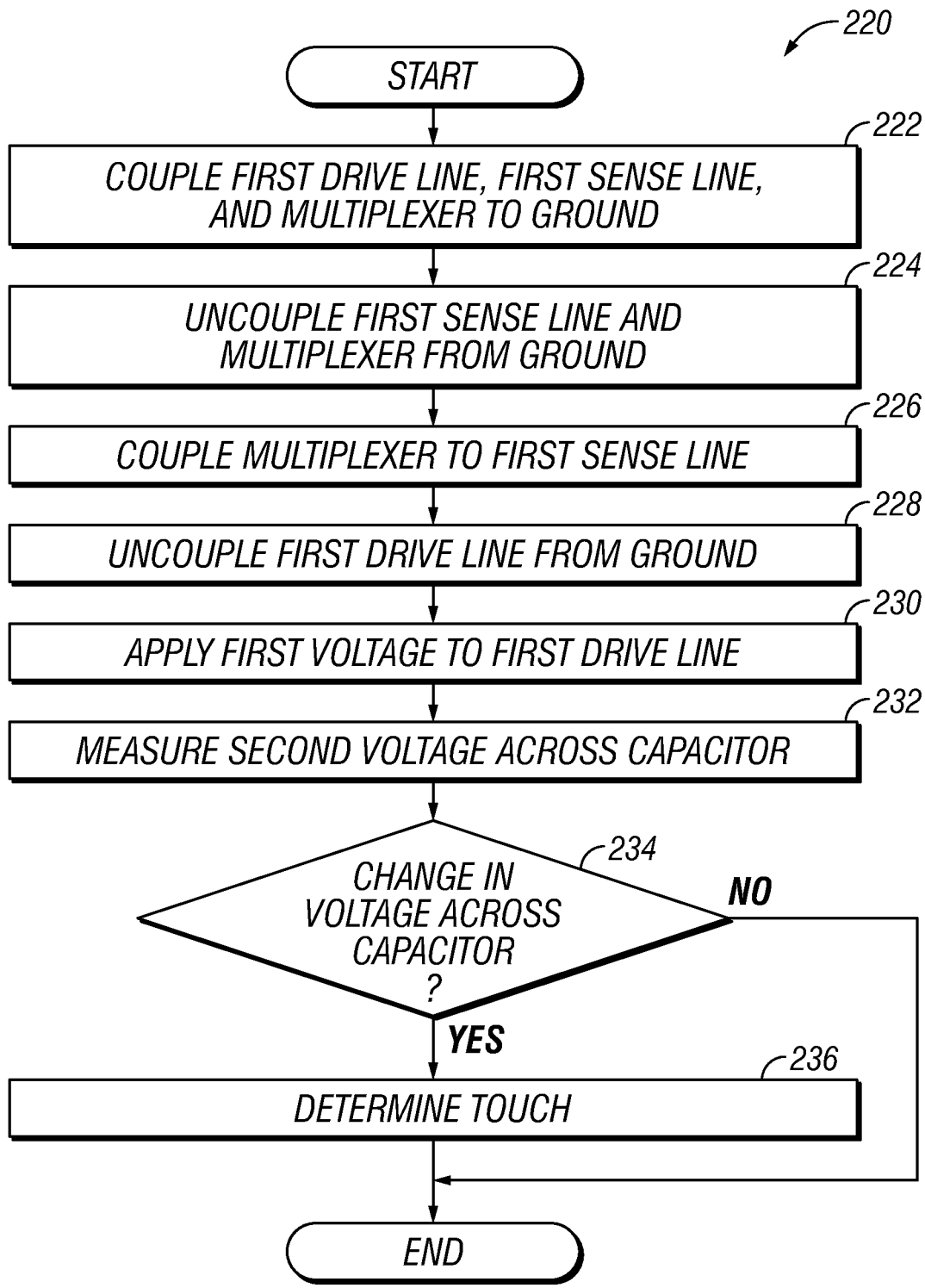
FIG. 2B illustrates an example method for sensing a touch in a mutual-capacitance (dual-electrode) touch sensor, according to certain embodiments of the present disclosure.

FIG. 2B illustrates an example method 220 for sensing a touch in a mutual-capacitance (dual-electrode) touch sensor 10, according to certain embodiments of the present disclosure. The method may start at step 222, where touch-sensor controller 12 couples drive line 202*a*, sense line 204*a*, and multiplexer 208 to ground. For example, touch-sensor controller 12 may couple drive line 202*a*, sense line 204*a*, and multiplexer 208 to ground 214 or to any suitable one or more components for driving the voltage of another component to a ground voltage. Touch sensor 12 may couple each of drive line 202*a*, sense line 204*a*, and multiplexer 208 to a separate component for driving the voltage of another component to a ground voltage or may couple two or more of drive line 202*a*, sense line 204*a*, and multiplexer to the same component. Touch-sensor 12 may couple multiplexer 208 to ground by switching multiplexer 208 to the input of ground 214 so that multiplexer is coupled to ground 214. Touch-sensor controller 12 may, in addition, couple drive line 202*b* and sense line 204*b* to ground, which may result in substantially all capacitance being discharged from the circuit of system 200.

At step 224, touch-sensor controller 12 may uncouple sense line 204*a* and multiplexer 208 from ground. At step 226, touch-sensor controller 12 may couple multiplexer 208 to sense line 204*a*. For example, touch-sensor controller may switch multiplexer 208 from an input of ground 214 to an input of sense line 204*a* so that multiplexer 208 is coupled to sense line 204*a*.

At step 228, touch-sensor controller 12 may uncouple drive line 202*a* from ground. At step 230, touch-sensor controller 12 may apply a voltage to drive line 202*a*. For example, touch-sensor controller 12 may couple drive line 202*a* to a voltage source. In particular embodiments, touch-sensor controller 12 may include an internal voltage source and may couple drive line 202*a* to the internal voltage source. Alternatively or in addition, touch-sensor controller 12 may couple drive line 202*a* to an external voltage source. Alternatively or in addition, touch-sensor controller 12 may use a drive unit to supply a drive signal to drive line 202*a*.

At step 232, touch-sensor controller 12 may measure a voltage across capacitor 212. For example, touch sensor controller 12 may measure a voltage at a point to one side of capacitor 212, measure a voltage at a point to the other side of capacitor 212, and determine the difference in the two measured voltages to determine the voltage across capacitor 212. Analog-to-digital converter 210 or any suitable component may measure the voltage across capacitor 212.

At step 234, touch-sensor controller 12 may determine whether the voltage across capacitor 212 has changed. For example, touch-sensor controller 12 may compare the voltage measured at step 232 to a reference voltage to determine whether there is a difference greater than a threshold amount. The reference voltage may be a voltage previously measured across capacitor 212, an average of two or more voltages previously measured across capacitor 212 at different times, a pre-programmed voltage amount, or any other suitable voltage amount. The threshold amount may be a pre-programmed number. Alternatively or in addition, the threshold amount may be a number determined based on previous measurements of voltages across capacitor 212 and calculations based on statistical methods. For example, the threshold amount may be equal to three standard deviations of a sample of voltages that have been measured across capacitor 212. If touch-sensor controller 12 determines that the voltage across capacitor 212 has changed more than the threshold amount, the method may continue at step 234. If touch-sensor controller 12 determines that the voltage across capacitor 212 has not changed more than the threshold amount, the method may end.

At step 236, touch-sensor controller 12 may determine a touch at capacitive node 206aa based on the voltage across capacitor 212. For example, if the voltage across capacitor 212 has changed, as determined at step 234, touch-sensor controller 12 may determine that there has been a touch at capacitive node 206aa. Because capacitive node 206aa and capacitor 212 are connected in series, due to the configuration of system 200 and the previous steps of method 220, and the voltage applied to drive line 202a may be considered constant, the circuit of system 200 may be considered a voltage divider. As a result, a change in the voltage across capacitor 212 may indicate a change in voltage across capacitive node 206aa. A change in voltage across capacitive node 206aa may indicate a change in capacitance across capacitive node 206aa. A change in capacitance across capacitive node 206aa may be assumed to be caused by a touch at capacitive node 206aa. Therefore, a change in the voltage across capacitor 212 may indicate a touch at capacitive node 206aa.

Particular embodiments may repeat the steps of method 220 of FIG. 2B, where appropriate. For example, particular embodiments may repeat method 220 to periodically determine whether a touch is occurring at capacitive node 206aa. Moreover, although this disclosure describes and illustrates particular steps of method 220 of FIG. 2B as occurring in a particular order, this disclosure contemplates any suitable steps of method 220 of FIG. 2B occurring in any suitable order. For example, touch-sensor controller 12 may uncouple drive line 202a from ground at step 228 before coupling multiplexer 208 to sense line 204a. Particular embodiments may include additional or fewer steps. For example, method 220 may include delaying, after applying the voltage to drive line 202a and before measuring the voltage across capacitor 212, to allow for charging of capacitive node 206aa and capacitor 212. As an additional example, touch-sensor controller 12 may perform additional steps, similar to all or some of the steps described above, for additional combinations of drive lines 202 and/or sense lines 204 to determine one or more touches at additional capacitive nodes 206 formed by the overlapping of corresponding drive lines 202 and sense lines 204. For example, touch-sensor controller 12 may couple drive line 202a, sense line 204b, and multiplexer 208 to ground; uncouple sense line 204b and multiplexer 208 from ground; couple multiplexer 208 to sense line 204b; uncouple drive line 202a from ground; apply a voltage to drive line 202a; measure the voltage across capacitor 212; determine whether there has been a change in the voltage across capacitor 212; and determine, based on the voltage across capacitor 212, a touch at capacitive node 206ab. Touch-sensor controller 12 may perform similar steps to determine touch at other capacitive nodes 206, including capacitive node 206ba, capacitive node 206bb, or any other capacitive nodes 206 that may be in particular embodiments, according to particular needs. Touch-sensor controller 12 may periodically repeat any combination of these or similar steps to periodically determine touches at various capacitive nodes 206 of touch sensor 10. When determining a touch at any particular capacitive node 206, all drive lines 202 and sense lines 204 not forming the measured capacitive node 206 may be driven to ground or some other DC potential so that those drive lines 202 and sense lines 204 do not parasitically couple to the drive line 202 and sense line 204 of the capacitive node 206 being measured. This may prevent a touch on one capacitive node 206 from affecting the signal measured an another. Furthermore, although this disclosure describes and illustrates particular components, devices, or systems carrying out particular steps of the method of FIG. 2B, this disclosure contemplates any suitable combination of any suitable components, devices, or systems carrying out any suitable steps of the method of FIG. 2B.

Figure 3:
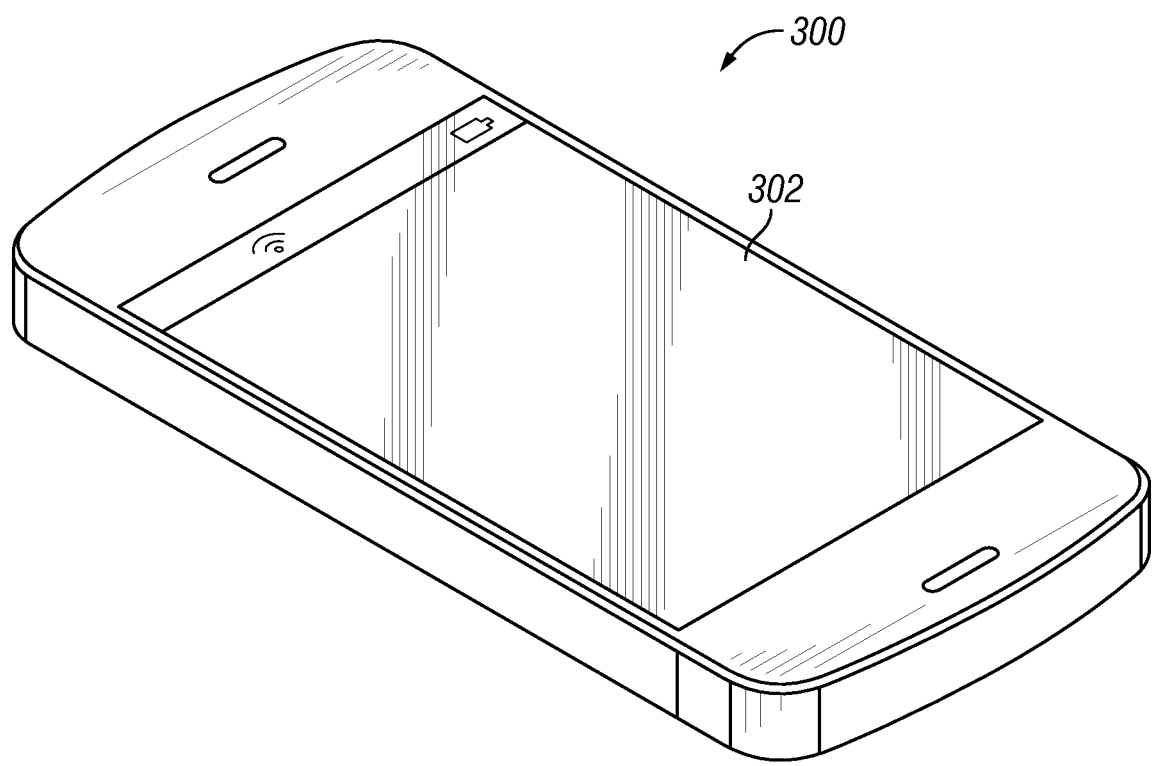
FIG. 3 illustrates a device that may incorporate any of the touch sensor, circuit, and method of FIGS. 1-2B, according to certain embodiments of the present disclosure.

FIG. 3 illustrates device 300 that may incorporate any of the touch sensor, circuit, and method of FIGS. 1-2B, according to certain embodiments of the present disclosure. Device 300 may include, by way of example and not limitation, a desktop computer, laptop computer, tablet computer, personal digital assistant (PDA), Smartphone, satellite navigation device, telephone, cell phone, portable media player, portable game console, kiosk computer, point-of-sale device, household appliance, automatic teller machine (ATM), any other device, or any combination of the preceding.

According to the illustrated embodiment, device 300 includes a touch-screen display 302. Touch-screen display 302 enables the touch screen to present a wide variety of data, including a keyboard, a numeric keypad, program or application icons, and various other interfaces as desired. A user may interact with device 300 by touching touch-screen display 302 with a single finger (or any other object), such as to select a program for execution or to type a letter on a keyboard displayed on the touch-screen display 302. In addition, the user may use multiple touches, such as to zoom in or zoom out when viewing a document or image, or single touches, where appropriate. In particular embodiments of device 300, such as home appliances, touch-screen display 302 may not change or may change only slightly during device operation, and may recognize only single touches.

Certain embodiments of the present disclosure may provide one or more technical advantages. In certain embodiments, system 200 may require fewer microcontroller-unit (MCU) pins than previous systems for sensing touch and may require only one pin for each drive line and each sense line. In certain embodiments, system 200 may not require input of a reference voltage to a comparator. In certain embodiments, system 200 may not require a Switch-Mode-Pump (SMP) pin, which may be required for discharging the external sense capacitors used in previous systems. System 200 may also require fewer external components than previous systems, including fewer or no external capacitors and/or resistors. System 200 may also exhibit lower frequency noise than previous systems for sensing touch. Unlike previous systems for sensing touch, system 200 may not be dependent on oscillator stability and may allow for improved software configurability. Also unlike previous systems, tuning of system 200 may be done entirely through software settings, with no hardware tuning (component selection) required.

Certain embodiments of the invention may include none, some, or all of the above technical advantages. One or more other technical advantages may be readily apparent to one skilled in the art from the figures, descriptions, and claims included herein.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch-sensor controller operable to:
apply a first voltage to a first drive line, the first drive line comprising a first one or more drive electrodes;
measure a second voltage across a capacitor, the capacitor being coupled to a first sense line, the first sense line comprising a first one or more sense electrodes;
determine, based on the second voltage across the capacitor, a touch at a first capacitive node formed by an overlapping of a first region of the first drive line and a first region of the first sense line;
couple the first drive line to a first ground;
couple the first sense line to a second ground;
couple a multiplexer to a third ground, the multiplexer being coupled to the capacitor;
couple the capacitor to a fourth ground;
uncouple the first sense line from the second ground;
uncouple the multiplexer from the third ground;
couple the multiplexer to the first sense line; and
uncouple the first drive line from the first ground.

2. The touch-sensor controller of claim 1, wherein the capacitor is comprised in an analog-to-digital-converter.

3. The touch-sensor controller of claim 1, wherein two or more of the first ground, the second ground, the third ground, and the fourth ground are the same ground.

4. A touch-sensor controller operable to:
apply a first voltage to a first drive line, the first drive line comprising a first one or more drive electrodes;
measure a second voltage across a capacitor, the capacitor being coupled to a first sense line, the first sense line comprising a first one or more sense electrodes;
determine, based on the second voltage across the capacitor, a touch at a first capacitive node formed by an overlapping of a first region of the first drive line and a first region of the first sense line;
uncouple the capacitor from the first sense line;
apply a third voltage to the first drive line;
measure a fourth voltage across the capacitor, the capacitor being coupled to a second sense line, the second sense line comprising a second one or more sense electrodes; and
determine, based on the fourth voltage across the capacitor, a touch at a second capacitive node formed by an overlapping of a second region of the first drive line and a first region of the second sense line.

5. The touch-sensor controller of claim 4, further operable to:
apply a fifth voltage to a second drive line, the second drive line comprising a second one or more drive electrodes;
measure a sixth voltage across the capacitor; and
determine, based on the sixth voltage across the capacitor, a touch at a third capacitive node formed by an overlapping of a first region of the second drive line and a second region of the first sense line.

6. The touch-sensor controller of claim 5, further operable to:
uncouple the capacitor from the first sense line;
apply a seventh voltage to the second drive line;
measure an eighth voltage across the capacitor, the capacitor being coupled to the second sense line; and
determine, based on the eighth voltage across the capacitor, a touch at a fourth capacitive node formed by an overlapping of a second region of the second drive line and a second region of the second sense line.

7. A method for sensing a touch comprising:
applying a first voltage to a first drive line, the first drive line comprising a first one or more drive electrodes;
measuring a second voltage across a capacitor, the capacitor being coupled to a first sense line, the first sense line comprising a first one or more sense electrodes;
determining, based on the second voltage across the capacitor, a touch at a first capacitive node formed by an overlapping of a first region of the first drive line and a first region of the first sense line;
coupling the first drive line to a first ground;
coupling the first sense line to a second ground;
coupling a multiplexer to a third ground, the multiplexer being coupled to the capacitor;
coupling the capacitor to a fourth ground;
uncoupling the first sense line from the second ground;

uncoupling the multiplexer from the third ground;
coupling the multiplexer to the first sense line; and
uncoupling the first drive line from the first ground.

8. The method of claim 7, wherein the capacitor is comprised in an analog-to-digital-converter.

9. The method of claim 7, wherein two or more of the first ground, the second ground, the third ground, and the fourth ground are the same ground.

10. A method for sensing a touch comprising:
applying a first voltage to a first drive line, the first drive line comprising a first one or more drive electrodes;
measuring a second voltage across a capacitor, the capacitor being coupled to a first sense line, the first sense line comprising a first one or more sense electrodes;
determining, based on the second voltage across the capacitor, a touch at a first capacitive node formed by an overlapping of a first region of the first drive line and a first region of the first sense line;
uncoupling the capacitor from the first sense line;
applying a third voltage to the first drive line;
measuring a fourth voltage across the capacitor, the capacitor being coupled to a second sense line, the second sense line comprising a second one or more sense electrodes; and
determining, based on the fourth voltage across the capacitor, a touch at a second capacitive node formed by an overlapping of a second region of the first drive line and a first region of the second sense line.

11. The method of claim 10, further comprising:
applying a fifth voltage to a second drive line, the second drive line comprising a second one or more drive electrodes;
measuring a sixth voltage across the capacitor; and
determining, based on the sixth voltage across the capacitor, a touch at a third capacitive node formed by an overlapping of a first region of the second drive line and a second region of the first sense line.

12. The method of claim 11, further comprising:
uncoupling the capacitor from the first sense line;
applying a seventh voltage to the second drive line;
measuring an eighth voltage across the capacitor, the capacitor being coupled to the second sense line; and
determining, based on the eighth voltage across the capacitor, a touch at a fourth capacitive node formed by an overlapping of a second region of the second drive line and a second region of the second sense line.

13. A system for sensing touch comprising:
a touch sensor comprising:
a substrate; and
a plurality of electrodes disposed on the substrate, the plurality of electrodes comprising:
a first one or more drive electrodes; and
a first one or more sense electrodes; and
a touch-sensor controller operable to:
apply a first voltage to a first drive line, the first drive line comprising the first one or more drive electrodes;
measure a second voltage across a capacitor, the capacitor being coupled to a first sense line, the first sense line comprising the first one or more sense electrodes;
determine, based on the second voltage across the capacitor, a touch at a first capacitive node formed by an overlapping of a first region of the first drive line and a first region of the first sense line;
couple the first drive line to a first ground;
couple the first sense line to a second ground;
couple a multiplexer to a third ground, the multiplexer being coupled to the capacitor;
couple the capacitor to a fourth ground;
uncouple the first sense line from the second ground;
uncouple the multiplexer from the third ground;
couple the multiplexer to the first sense line; and
uncouple the first drive line from the first ground.

14. The system controller of claim 13, wherein the capacitor is comprised in an analog-to-digital-converter.

15. The system of claim 13, wherein two or more of the first ground, the second ground, the third ground, and the fourth ground are the same ground.

16. A system for sensing touch comprising:
a touch sensor comprising:
a substrate; and
a plurality of electrodes disposed on the substrate, the plurality of electrodes comprising:
a first one or more drive electrodes;
a first one or more sense electrodes; and
a second one or more sense electrodes; and
a touch-sensor controller operable to:
apply a first voltage to a first drive line, the first drive line comprising the first one or more drive electrodes;
measure a second voltage across a capacitor, the capacitor being coupled to a first sense line, the first sense line comprising the first one or more sense electrodes;
determine, based on the second voltage across the capacitor, a touch at a first capacitive node formed by an overlapping of a first region of the first drive line and a first region of the first sense line;
uncouple the capacitor from the first sense line;
apply a third voltage to the first drive line;
measure a fourth voltage across the capacitor, the capacitor being coupled to a second sense line, the second sense line comprising the second one or more sense electrodes; and
determine, based on the fourth voltage across the capacitor, a touch at a second capacitive node formed by an overlapping of a second region of the first drive line and a first region of the second sense line.

17. The system of claim 16, wherein the plurality of electrodes further comprises a second one or more drive electrodes and wherein the touch-sensor controller is further operable to:
apply a fifth voltage to a second drive line, the second drive line comprising the second one or more drive electrodes;
measure a sixth voltage across the capacitor; and
determine, based on the sixth voltage across the capacitor, a touch at a third capacitive node formed by an overlapping of a first region of the second drive line and a second region of the first sense line.

* * * * *